May 20, 1941.  J. C. CROWLEY  2,242,569
VALVE STEM
Original Filed Aug. 7, 1936
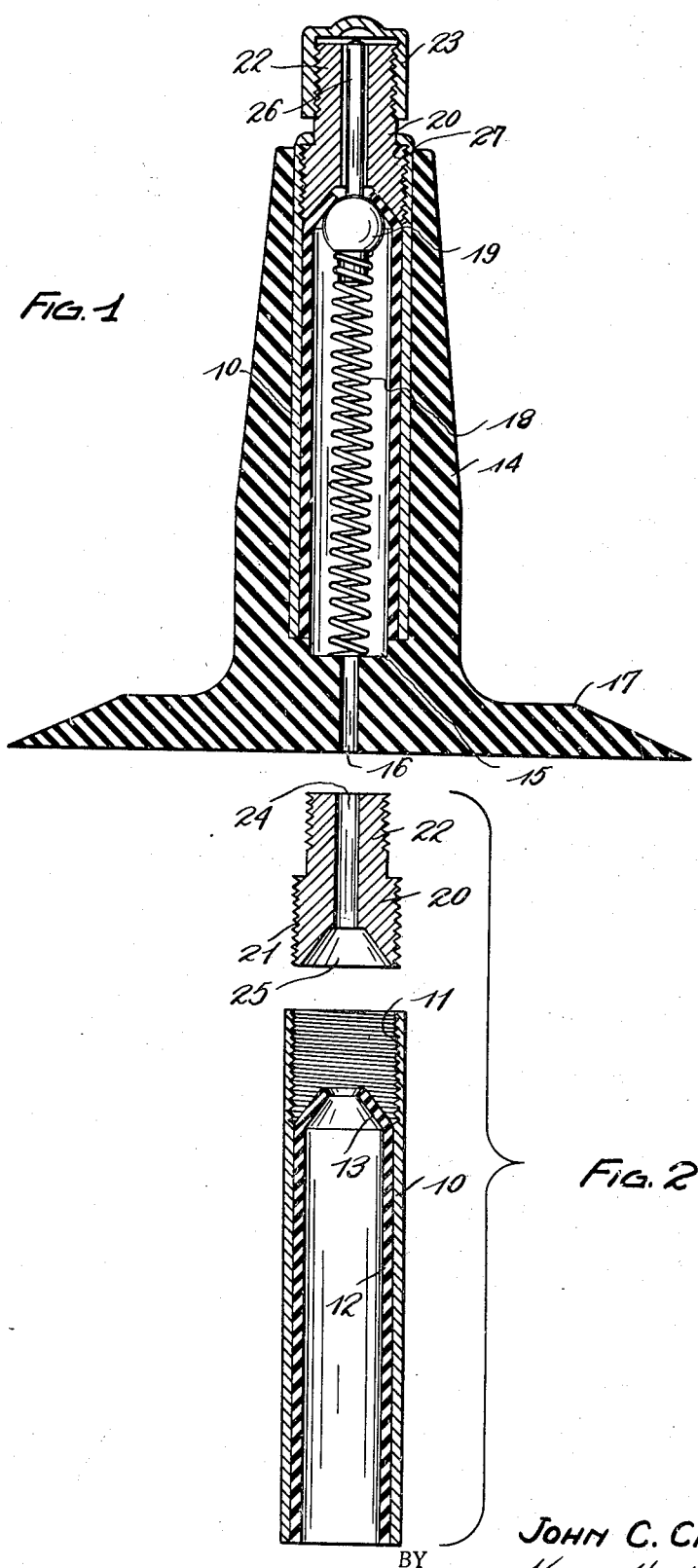
INVENTOR.
JOHN C. CROWLEY
BY Kwis Hudson & Kent
ATTORNEYS Patented May 20, 1941

2,242,569

UNITED STATES PATENT OFFICE 2,242,569

VALVE STEM

John C. Crowley, Cleveland Heights, Ohio, assignor to The Dill Manufacturing Company, Cleveland, Ohio, a corporation of Ohio Original application August 7, 1936, Serial No. 94,765. Divided and this application March 21, 1940, Serial No. 325,215

1 Claim. (Cl. 152—429)

This invention relates to a valve stem for use with pneumatic tires and other inflatable articles and particularly to a rubber valve stem.

This application is a division of application Serial No. 94,765, filed August 7, 1936.

An object of the invention is to provide a rubber valve stem for pneumatic tires or other inflatable articles and which stem may be vulcanized to the tire or article and will have the usual advantages of a rubber valve stem, but at the same time will be so formed as not to balloon or bulge under air pressures.

Another object is to provide a rubber valve stem wherein the usual valve insides or core does not need to be employed since the seat for the valve is formed by a portion of the stem itself.

Another object is to provide a rubber valve stem of the character above specified wherein the valve seat that is structurally part of the stem may be formed of softer or different rubber than the stem yet is of sufficient rigidity or is so reenforced that the air pressures will not cause the valve to distend the seat with the possibility that the valve might blow out of the stem.

Another object is to provide a rubber valve stem which is simple in construction, efficient in operation, and which can be readily manufactured and the valve assembled therein.

Further and additional objects and advantages not hereinbefore specified will become apparent hereinafter during the detailed description of an embodiment of the invention which is illustrated in the accompanying drawing wherein,—

Fig. 1 is a sectional view on an enlarged scale through the valve stem embodying the invention, and Fig. 2 is a sectional view showing certain of the elements of the stem shown in Fig. 1 and arranged in separated relationship.

In the valve stem shown in the drawing the member 10 is a reenforcing member and, prior to its final assembly in the stem, is a straight cylindrical member having one end thereof internally threaded as indicated at 11. A rubber lining 12 is molded in the member 10 and extends from the unthreaded end thereof to adjacent the inner end of the threaded portion 11, at which point the rubber lining is of conical formation as indicated at 13.

The member 10 with its rubber lining 12 is molded in a rubber valve stem 14 that is provided with a counterbore of a diameter to receive the member 10, while at the lower end of the counterbore there is a short counterbore 15 which communicates with a small bore 16 that extends from such point through the stem and the base 17 thereof. When the stem 14 has been molded upon the member 10 the valve spring 18 and the valve 19 are passed inwardly of the member 10 from the outer end of the stem and pushed through the conical portion 13 of the rubber lining 12, it being understood that said portion can flex and the opening therein be expanded to allow the insertion of the valve spring and valve. The spring 18 abuts at its lower end the bottom of the counterbore 15 in the stem, while its upper end, of course, abuts the valve 19. When the valve and spring have been thus positioned a secondary reenforcing member 20 is assembled with the other parts of the stem. The member 20 has an enlarged externally threaded portion 21 which screws into the threaded portion 11 of the member 10. The member 20 also has a reduced externally threaded portion 22 at its outer end and upon which a valve cap 23 can be screwed. The member 20 is provided with a bore 24 which terminates at its inner end in a conical enlargement 25.

The member 20 is screwed into the member 10 until the conical enlargement 25 of the bore 24 tightly engages the conical portion 13 of the rubber lining 12 in the member 10 and reenforces said portion which then acts as the valve seat. It will be noted that the valve seat, due to the engagement of the member 20 with the portion 13 of the rubber lining, is sufficiently stiff to prevent the valve 19 from pushing outwardly through the conical portion 13 of the rubber lining.

The valve pin 26 for depressing the valve 19 from the seat formed by the portion 13 of the rubber lining when it is desired to inflate or deflate the article to which the stem is attached extends upwardly through the bore 24 in the member 20 and its function will be well understood in the art.

The member 10 is of such length that when it is mounted in the valve stem 14 the member will extend beyond the outer end of the stem, and thus when the member 20 has been tightly screwed into position to reenforce and back up the valve seat 13, as has been previously described, the outwardly extending end of the member 10 can be bent over into tight engagement with the shoulder formed between the portions 21 and 22 of the member 20 as indicated at 27. When this has taken place it will be seen that the member 20 is securely locked to the member 10 and inasmuch as the bent over end 27 of the member 10 is brought into very tight engagement with the shoulder on the member 20 said member is held against rotation relative to the member 10.

It will be seen that a rubber valve stem embodying the present invention can be formed of relatively soft rubber, but due to the reenforcing members in the stem will not bulge under air pressures. It will also be seen that the stem is provided with a seat formed as a structural part of the stem, thus eliminating the use of the usual valve insides or cores and, due to the fact that such seat is adequately reenforced or backed up, there will be no danger of the valve expanding the seat under air pressure and passing through the restricted orifice formed by the seat. It will also be noted that the stem provides for readily assembling the valve and its spring within the stem, while the member 10 reenforces the stem substantially throughout the length thereof.

Although an embodiment of the invention has been illustrated and described herein it should be understood that the invention is susceptible of various modifications and adaptations within the scope of the appended claim.

Having thus described my invention I claim:

A rubber valve stem having integral base and stem portions, said stem portion being provided with an axially disposed bore, a rigid tubular reenforcing member secured in said bore and projecting slightly beyond the outer end thereof, the outer end of said member being interiorly threaded, a rubber lining separate from the material of said stem molded to the interior of said member and having the outer end thereof adjacent the internally threaded portion of the member and of inwardly extending conical formation, and a second reenforcing member screwed into the threaded end of the first named reenforcing member and provided with a conical recess interfitting the conical portion of the rubber lining whereby said second member acts to reenforce said conical portion of the rubber lining, said members having cooperating portions forming an interlock therebetween.

JOHN C. CROWLEY.